Jan. 10, 1950   C. O. MARSHALL, JR., ET AL   2,494,136
MEAT TENDERIZING MACHINE
Filed Oct. 4, 1944   2 Sheets-Sheet 1
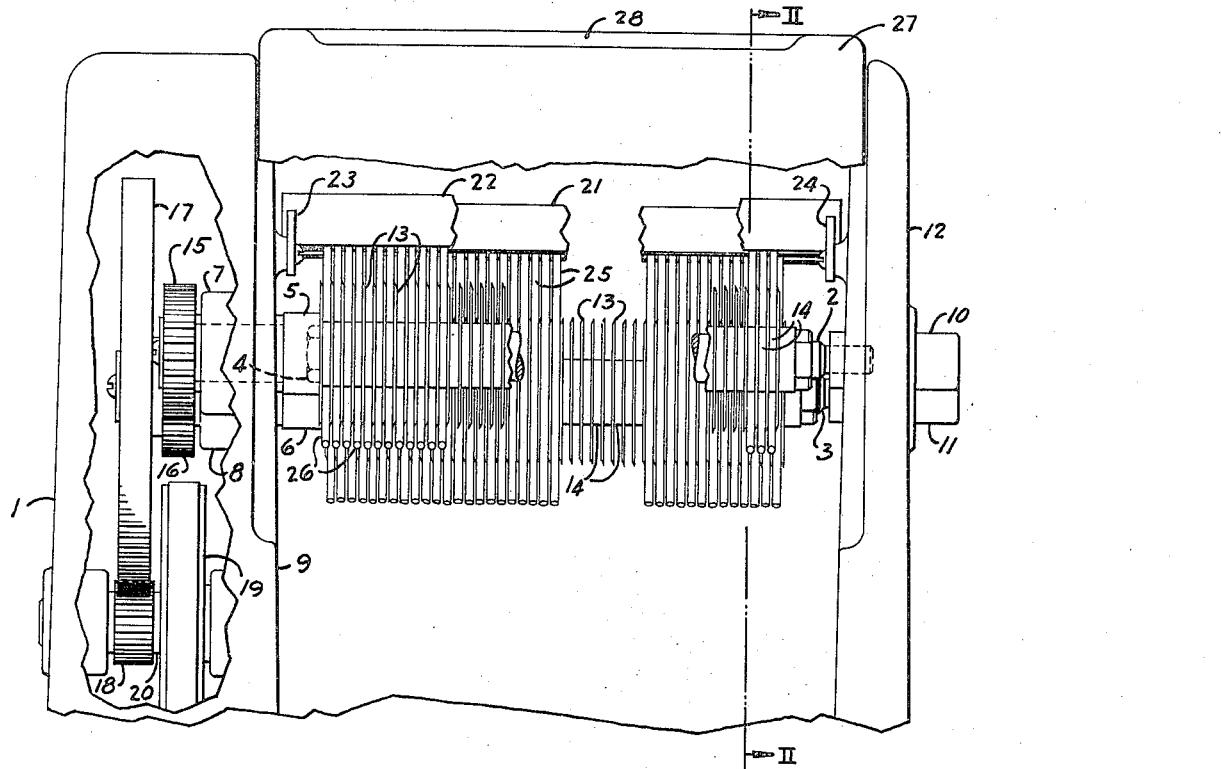
Fig. I
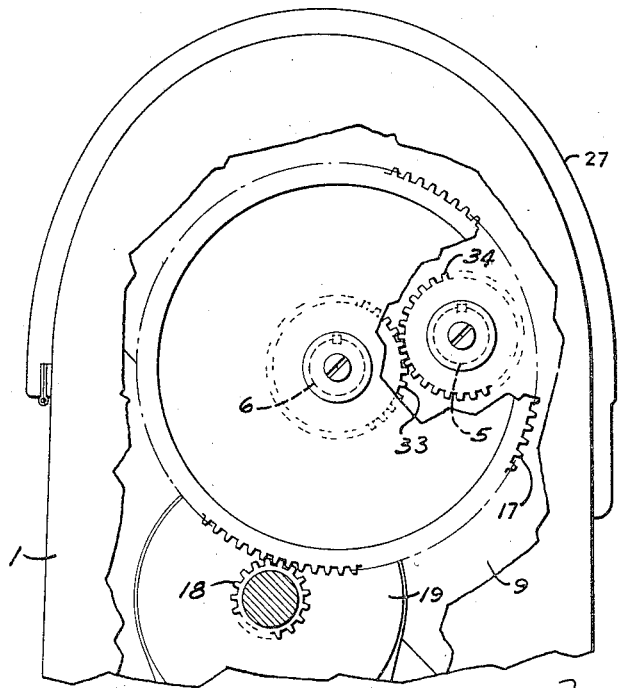
Fig. IV
Charles O. Marshall Jr.
Maynard C. Yeasting
INVENTORS
BY
Marshall & Marshall
ATTORNEYS

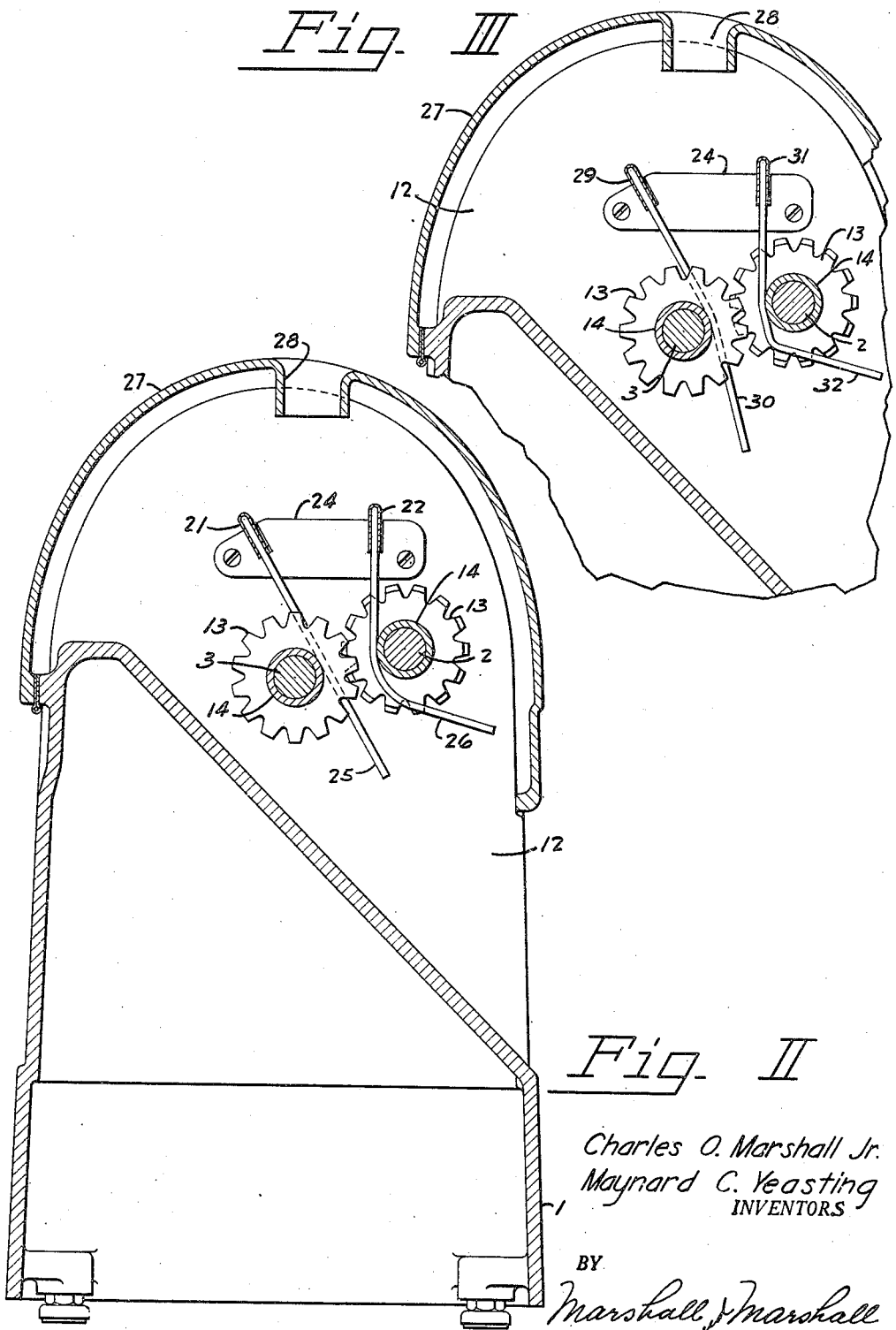

Patented Jan. 10, 1950

2,494,136

UNITED STATES PATENT OFFICE 2,494,136

MEAT TENDERIZING MACHINE

Charles O. Marshall, Jr., and Maynard C. Yeasting, Toledo, Ohio, assignors to Toledo Scale Company, Toledo, Ohio, a corporation of New Jersey Application October 4, 1944, Serial No. 557,091

2 Claims. (Cl. 17—26)

This invention relates to tenderizing machines and in particular to an improvement which causes the tenderized meat to be carried forward in such a manner that it may be readily caught by the operator.

Machines have been built for tenderizing meat, the most popular form being one in which the meat is passed between a pair of rotating arbors each of which is provided with a large number of serrated or toothed circular knives. The tenderized meat is prevented from wrapping around the knives by a pair of metal combs whose teeth pass through the spaces between the knives and next to the arbors. The combs act to guide the meat to the knives and to strip the meat from the knives after it has been tenderized. In conventional machines, the portions of the combs extending below the knives lie substantially parallel to each other and are nearly vertical. The tenderized meat, as it is stripped from the knives, slides down through the space between the combs onto a sloping tray within the operator's reach. In this type of machine, meat which has been passed between the knives several times, as in common practice, tends to clog or stick between the combs and to be pulled through the combs by the teeth of the knives.

The object of this invention is to provide a tenderizing machine in which the tenderized meat is automatically carried forward to a point where it may drop into the operator's hand and in which there is no tendency for the meat to collect on the combs.

Another object of the invention is to provide a particular shape for the combs of a meat tenderizing machine such that the meat is stripped successively from the rear and from the front knives.

Another object is to provide for a difference in the peripheral speeds of the knives carried by the rear arbor and the knives carried by the front arbor such that the meat is first stripped from the knives of the rear arbor and then stripped from the knives of the front arbor.

These and other objects and advantages are attained in the structure shown in the drawings which illustrate preferred embodiments of the invention.

In the drawings:

Figure I is a fragmentary front elevation with portions broken away to show the essential parts of a meat tenderizing machine.

Figure II is a vertical section taken substantially along the line II—II of Figure I.

Figure III is a fragmentary vertical section showing another form of stripping combs.

Figure IV is a fragmentary end elevation with parts broken away showing a portion of the mechanism for driving the knife-carrying arbors.

In the preferred form of the invention the front comb is curved part way around the front arbor within the periphery of the knives on the arbor so that the tenderized meat may be stripped entirely free of the knives of the rear arbor before there is any tendency whatsoever for the meat to be stripped from the knives on the front arbor. This permits the meat to be carried forward entirely free of the rear comb and to be projected forward into the operator's hand, thus saving him the trouble of picking the meat off an inclined tray placed below the knives. The invention is not limited to this preferred method of accomplishing this result inasmuch as the meat may be cleanly stripped from the knives of the rear arbor by rotating the front arbor slightly faster. Once a definite tendency for the meat to follow the knives of the front arbor is attained and the front comb is bent forward to provide a diverging exit from the knives, there is little tendency for the meat to stick or collect on either the knives or the combs.

The tenderizing machine shown in the drawings comprises a frame 1 in which a pair of arbors 2 and 3 are mounted. The arbors 2 and 3 are provided with hexagonal portions 4 which fit corresponding recesses in stub shafts 5 and 6. The stub shafts are journaled in bosses 7 and 8 formed in a vertical wall 9 of the frame 1. The other ends of the arbors 2 and 3 are journaled in sleeves 10 and 11 mounted in another vertical wall 12 of the frame 1. Each of the arbors carries a plurality of toothed cutting knives 13 which are separated and spaced along the arbors by spacers 14. For convenience in cleaning the knives after use the sleeves 10 and 11 are made easily removable so that the arbors 2 and 3 may be released from the recesses in the stub shafts and may be lifted clear of the machine. The stub shafts 5 and 6 are geared together for rotation in opposite directions by a pair of equal-diameter gears 15 and 16. The stub shaft 6, in addition to the gear 16, carries a large gear 17 meshing with a pinion 18, which, along with a pulley 19, is carried on a countershaft 20. The pulley 19 is driven by an electric motor enclosed in the lower portion of the frame 1.

A pair of combs 21 and 22 are carried in notches cut in brackets 23 and 24 secured to the walls 9 and 12 at points above the arbors 2 and 3. The back comb 21 has a series of straight teeth 25, which, projecting forwardly and downwardly, pass between the knives 13 on the arbor 3. The notches in the brackets 23 and 24 provide sufficient clearance so that the combs may oscillate through a small distance. In operation, because of the small clearance between the teeth 25 and the knives 13, the knives tend to pull the comb downward and against the spacers 14.

The front comb 22 carries a series of curved teeth 26. The teeth 26, when the comb is mounted in the brackets 23 and 24, extend vertically downward until they become tangent to the spacers 14 on the arbor 2. From this point they curve forwardly in a smooth curve passing the outer periphery of the knives 13 in a generally horizontal direction.

A cover 27 extending over the knives has a longitudinal slot 28 disposed vertically above the intermeshed portions of the knives. Meat is fed through the slot 28 and is guided by the combs 21 and 22 into the knives 13. As the meat passes between the knives it is urged toward the knives on the front arbor 2 by the teeth 25 of the comb 21. This action results from so placing the comb 21 that its upper end is tilted backwardly away from a line perpendicular to the plane including the axes of the arbors 2 and 3. In this manner the distance between the teeth 25 of the back comb 21 and the knives 13 on the front arbor 2 is still decreasing after the teeth on the back arbor 3 start to withdraw from the meat. This causes the meat to follow the knives 13 on the front arbor 2 and to pull clear of the knives on the rear arbor 3 and the lower end of the comb teeth 25. As the meat follows around the front arbor 2 it is dislodged from the teeth of the knives 13 on that arbor by the curved portions of the comb teeth 26. At this point, since the meat is clear of the back comb 21 and is moving forward substantially horizontally, the action of gravity assists the comb teeth 26 in dislodging the meat and the meat is freely projected forward into space and may be easily caught in the operator's hand. As a result of pulling the meat forward clear of the comb teeth 25 and stripping it from the knives of the front arbor 2 in a substantially radial direction by means of the generally horizontal portions of the front comb teeth 26, there is very little tendency for meat to collect on the combs on the discharge side of the knives.

In Figure III a modification is shown, comprising a back comb 29 having teeth 30. The teeth 30 are bent as they pass the back arbor 3 so that their lower portions extend downwardly substantially perpendicular to the plane through axes of the arbors 2 and 3. A front comb 31 is provided with teeth 32 which extend substantially vertically downward until they become tangent to the spacers 14 of the front arbor 2, then are bent forward so that they lie parallel to the back teeth 30, and then, just before they reach the root circle of the teeth of the knives 13 are bent forward in a generally horizontal direction. This arrangement may be called a "straight feed" because the passage between the knives, as defined by the combs, is substantially perpendicular to the line of centers of the knives. In a straight feed there is no inherent tendency for the tenderized meat to follow one knife in preference to the other. As a result, the meat tends to slide down the back comb teeth 30 by gravity. In order to prevent the meat from collecting on the comb in this modification, the front arbor 2 is rotated at a greater speed than the rear arbor, so that the knives 13 on the front arbor tend to pull on the meat more than the back knives. The relieving of the pressure on the forward side of the teeth of the back knives without drawing the meat against the trailing edges of the teeth of the back knives allows them to strip easily from the meat so that the meat follows the front knives. The last bend in the teeth 32 of the front comb allows the meat to follow forward in a horizontal direction until it is finally stripped from the front knives in a substantially radial direction.

The modification in the gearing required to accomplish the change in speed is shown in Figure IV. The drive is from a motor (not shown) to the pulley 19. The pinion 18 transmits the power to the large gear 17 mounted on the stub shaft 6. A gear 33, of slightly larger diameter than the gear 16 of Figure I, is mounted on the stub shaft 6 in place of the gear 16 and meshes with another gear 34 mounted on the stub shaft 5. The sum of the numbers of teeth on the gears 33 and 34 is equal to the sum of the numbers of the teeth on the gears 15 and 16. However, the difference in diameter, the gear 33 being larger and the gear 34 being smaller than the gear 15 or 16, causes the front arbor to rotate faster than the rear arbor.

The same effect is also present when equal arbor speeds are used if the knives on the front arbor have a larger diameter and hence a greater peripheral speed. In either case it is the difference in peripheral speed of the meat contacting edges of the knives which produces the effect.

The improved operation of the meat tenderizer is shown to be accomplished in either of two ways. These are representative of structures for accomplishing the desired result, i. e. clean stripping and forward delivery of the tenderized meat. The result is obtained whenever the tenderized meat is completely stripped from the knives of the rear arbor and is moving forward generally horizontally before it is stripped from the knives of the front arbor.

Having described the invention, we claim:

1. In a device for tenderizing meat, in combination, a pair of arbors each carrying a plurality of toothed meat tenderizing knives, a back comb having teeth interleaved with the knives of the back arbor and passing between the arbors for defining one side of a downwardly and forwardly directed passage between the arbors, a front comb having teeth interleaved with the knives of the front arbor for defining the other side of the passage, said arbors being arranged in generally parallel relation with the front arbor forward of and higher than the back arbor, said back comb having generally straight teeth arranged such that their closest approach to the front arbor occurs below a line through the centers of the arbors, said front comb having teeth the upper ends of which converge toward the back comb in the space above the arbors and the lower ends of which curve forward in the spaces between the knives of the front arbor below the line of centers of the arbors and leave such spaces at points forward of a vertical plane through the front arbor.

2. In a device for tenderizing meat, in combination, a pair of arbors each carrying a plurality of toothed meat tenderizing knives, a pair of combs having teeth interleaved with the knives and passing between the arbors, the front one of said combs having a bend in the space between the knives and below the line of centers of the arbors along a generally circular arc the center of which is forward of and above the front arbor and the radius of which is generally equal to the radius of one of the knives.

CHARLES O. MARSHALL, Jr.
MAYNARD C. YEASTING.

REFERENCES CITED

The following references are of record in the file of this patent:

UNITED STATES PATENTS

| Number | Name | Date |
| --- | --- | --- |
| 434,238 | Bischoff | Aug. 12, 1890 |
| 1,979,464 | Gurney | Nov. 6, 1934 |
| 2,346,686 | Jackson | Apr. 18, 1944 |
| 2,409,463 | Ahrndt | Oct. 15, 1946 |